J. WEED.

Improvement in Chain-Hook.

No. 132,224.  Patented Oct. 15, 1872.

Witnesses:
G. B. Towles
H. A. Daniels

Inventor:
John Weed
By W. Burris Atty

UNITED STATES PATENT OFFICE.

JOHN WEED, OF LYONS, IOWA.

IMPROVEMENT IN CHAIN-HOOKS.

Specification forming part of Letters Patent No. 132,224, dated October 15, 1872.

*To all whom it may concern:*

Be it known that I, JOHN WEED, of Lyons, in the county of Clinton and State of Iowa, have invented certain new and useful Improvements in Trace, Chain, or Tug Hooks; and I do hereby declare that the following is a full, clear, and exact description thereof, that will enable others skilled in the art to which it appertains to make and use the same, reference being had to the accompanying drawing and to the letters of reference marked thereon which form a part of this specification.

My invention consists of a concentric curved hook so constructed and arranged that all parts of the hook beyond the shank will be equidistant from the concentric eye, upon which it operates, so that the hook may be readily removed from the connecting link or eye with very slight slackening of the trace and still not be liable to become unhooked of itself. The eye of the hook is provided with recesses to receive the inner surfaces of the spring-clip, to which the hook is attached to hold it in place and to prevent rattling when in use.

Figure 1:
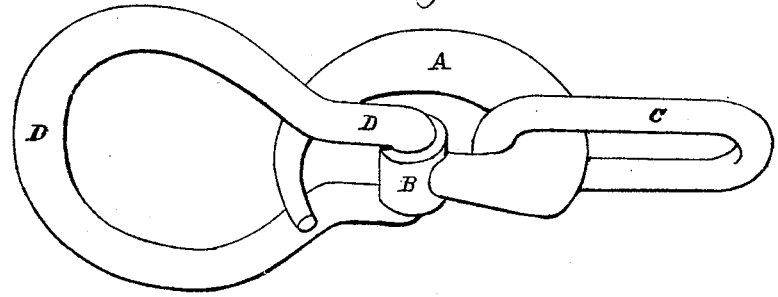
Figure 2:
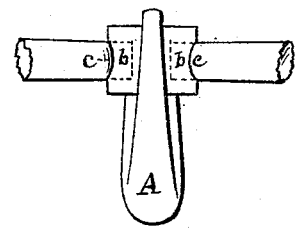

Figure 1 of the drawing is a perspective view; Fig. 2, a back view, showing the recesses in the hook-eye; and Fig. 3 is a view of the hook turned out of the connecting-link of the trace.

A is the hook, of such length and so curved as to extend around and equidistant from the concentric eye B, so that the hook may be readily removed from the connecting-link C with very slight slackening of the trace, and at the same time not be liable to become unhooked of itself. (See Figs. 1 and 3 of the drawing.) D is a spring-clip, with open ends *b b* made to spring into and hold eye B, which is provided with recesses *c c* to receive the inner surfaces of the clip, for the purpose of holding the hook in place and to prevent it from rattling while in use. The spring-clip may be dispensed with, and the hook may be attached to a bolt, or in any other manner, by which it will operate substantially as described.

Figure 3:
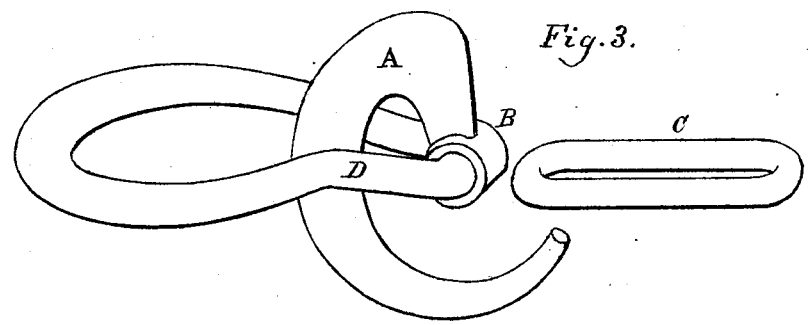

All the parts of the hook being equidistant from the concentric eye, on which it turns, to remove the hook from the connecting link or eye of the trace it is necessary to slacken it only very slightly so that the hook may be readily turned out, as shown in Fig. 3.

What I claim, and desire to secure by Letters Patent, is—

The concentric curved hook A, having eye B with recesses *c*, in combination with spring-clip D or its equivalent, substantially in the manner and for the purpose described.

In testimony that I claim the foregoing I have hereunto set my hand this 27th day of July, 1872.

JOHN WEED.

Witnesses:
    W. W. SANBORN,
    ROBERT HOYLE.